March 26, 1929. E. BUGATTI 1,706,521
BRAKING DEVICE FOR THE STEERING GEAR OF MOTOR VEHICLES
Filed May 6, 1927
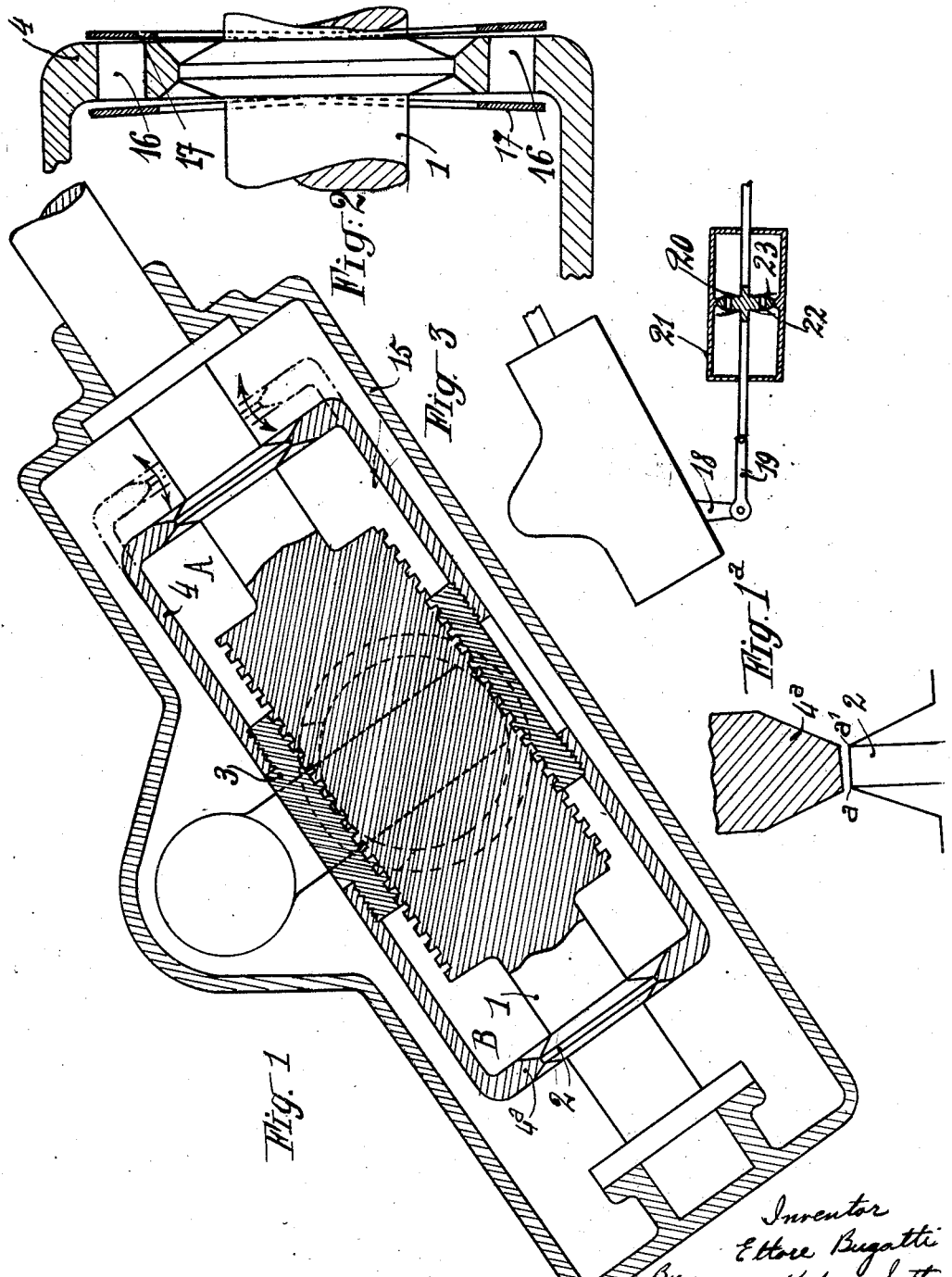
Inventor
Ettore Bugatti
By Cameron, Kerkam & Sutton
attorneys.

Patented Mar. 26, 1929.

1,706,521

UNITED STATES PATENT OFFICE.

ETTORE BUGATTI, OF MOLSHEIM, FRANCE.

BRAKING DEVICE FOR THE STEERING GEAR OF MOTOR VEHICLES.

Application filed May 6, 1927, Serial No. 189,400, and in France May 14, 1926.

The steering gear of motor vehicles must be made reversible when it is desired to be able to determine the position of the wheels and to bring them into the proper direction when required, by observing the position of the steering wheel.

But the reversible construction is very defective, due to the fact that owing to the rough places in the road such as holes or broken stone, the wheels will turn upon the axis of their spindles, thus drawing with them the levers, nuts and screws employed for the steering, and hence the steering lever, thus producing slight circular deflections which are very rapid.

The speed of these deflections is such that the driver's hand will receive an abrupt shock of a most fatiguing nature. The number and abruptness of these shocks will depend directly upon the degree of reversibility, the speed and the weight of the vehicle, and upon the number and depth (or height) of the obstacles on the road. After a time, such shocks will produce a certain numbness in the driver's arm.

To obviate such defects, various methods have been proposed, of which the best consists in providing the rim of the steering wheel with an elastic mass which will absorb these circular shocks to a certain degree; but such methods are only palliative and have but little effect.

The present invention relates to means for braking or retarding the movements of the steering gear when in the mean steering position, i. e. when the vehicle is traveling in a straight line, but ineffective to produce braking when the steering wheel is turned through a certain angle. Such braking means may be either hydraulic or mechanical.

The following description with reference to the appended drawings shows the operation of the apparatus according to the invention.

Fig. 1 is a sectional view of a steering casing provided with oil braking means.

Fig. 1ª shows a detail on a larger scale.

Fig. 2 represents a modification in which the end of the steering nut is provided with a clack valve.

Fig. 3 shows the braking method as applied to the controlling link of the steering gear.

According to the arrangement which is shown in Fig. 1, the screw 1 is provided with one, two or several circular flanges 2. To the nut 3 are secured the sleeves 4 of suitable length, whose ends 4ª surround the flanges 2 with a certain play (Fig. 2) in such manner as to form two chambers A and B on the respective sides of the nut.

The operation of the said braking device is as follows:—

When a shock occurs upon one of the wheels, the steering shaft of the steering lever will rotate in a given direction, for instance such that the nut 3 will descend and will thus force the screw on shaft 1 and all the parts secured thereto to rotate at a relatively greater speed, as the nut is moved longitudinally upon the screw. If it is supposed that the casing 15 has been filled with oil, the volume of the chamber A will tend to diminish due to the motion of the nut on the steering screw, whilst the volume of the chamber B tends to increase. Since the oil, like all liquids, is incompressible, it will tend to escape from the chamber A and to enter the chamber B by way of the play between the flanges 2 and the edges 4ª of the sleeves 4 secured to the nut. This play is determined by experience and will depend upon the diameter of the flange 2 and the length of the cylindrical part $a\ a^1$ (Fig. 1ª). Since the amount of play is very small, an energetic braking will take place.

In order that the braking shall act only in a straight line, the cylindrical faces of the flange 2 and of the edge 4ª have a sufficient length (while being as narrow as possible) to remain opposite one another during such relative movements of the nut and the screw take place during travel in a straight line.

When the vehicle makes a turn, a certain resistance must be overcome in the first place, which will cease when the sleeve 4 has moved beyond the flange 2 and has for instance assumed the position shown in the dot and dash lines in which the oil may freely circulate, as shown by the arrow.

Fig. 2 shows a modified form of the steering device represented in Fig. 1. The end of the sleeve 4 is pierced with a certain number of holes 16. To the sides of this end portion are riveted the light sheet metal discs 17 which are slightly spaced from the edges of the holes 16 as shown. The circular flange 2 fits upon the interior of the end portion by slight friction, i. e. almost without play. When the said nut is abruptly moved by reason of a shock upon the wheels, the pressure of the oil will bring the elastic discs 17 upon the holes 16 whereby the motion will be rapidly braked.

If the vehicle is steered to make a turn, the movement of the steering wheel is relatively slow, the sleeve 4 will move slowly and the oil will circulate freely through the holes at the beginning without operating either of the disks 17, and then in the same manner as above indicated.

Fig. 3 shows diagrammatically the case in which the braking method of Figs. 1 and 2 is adapted to the steering lever 18. Said lever is connected by a link 19 with a piston 20 movable in a cylinder 21 which is filled with fluid. The said piston may be apertured at 22 as in Fig. 2, the holes being closed by the discs 23 in the event of an abrupt shock, as specified with reference to Fig. 2.

Obviously, the apparatus is susceptible of many modifications without departing from the principle of the invention.

What I claim is:—

1. A retarding device for the steering gear of motor vehicles adapted to act only in the mean steering position, comprising in combination, a steering box, a steering shaft, a steering screw mounted on the said shaft, a steering nut coacting with the said screw and contained in the said box, two rigid members oppositely disposed and spaced apart by a short interval, one of the said members being stationary and the other movable with the said nut, means for confining a liquid between said rigid members to be displaced by relative movement of said members, and means whereby the liquid displaced is constrained to move through the said interval.

2. A retarding device for the steering gear of motor vehicles adapted to act only in the mean steering position, comprising in combination, a steering box, a steering shaft, a steering screw mounted on the said shaft, a steering nut coacting with the said screw and contained in the said box, shoulders formed on the said shaft on either side of the said screw, a sleeve mounted on the said nut, inwardly projecting annular flanges on the said sleeve arranged opposite the said shoulders when in the mean position of the said nut with a small clearance between the said flange and shoulder, and an incompressible fluid filling said steering box and the space between said cylinder and shaft.

3. A retarding device for the steering gear of motor vehicles adapted to act only in the mean steering position, comprising in combination, a steering box, a steering shaft, a steering screw mounted on the said shaft, a steering nut coacting with the said screw and contained in the said box, shoulders formed on the said shaft on either side of the said screw, a sleeve mounted on the said nut, inwardly projecting annular flanges formed on the said sleeve and placed opposite the said shoulders when in the mean position of the said nut, with a very small clearance between said flange and shoulder, said flanges having apertures formed therein, and thin elastic rings riveted upon either side of the said shoulder normally out of contact with the said flanges near the apertures to form clack valves on opposite sides of said apertures.

In testimony whereof I have signed this specification.

ETTORE BUGATTI.